US010947404B2

(12) United States Patent
Toles et al.

(10) Patent No.: US 10,947,404 B2
(45) Date of Patent: Mar. 16, 2021

(54) INK FIXATIVE SOLUTION

(71) Applicant: Hewlett-Packard Development Company, L.P., Houston, TX (US)

(72) Inventors: Christopher Arend Toles, Corvallis, OR (US); Thomas Roger Oswald, Boise, ID (US); Xulong Fu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/084,494

(22) PCT Filed: Jul. 21, 2016

(86) PCT No.: PCT/US2016/043263

§ 371 (c)(1), (2) Date: Sep. 12, 2018

(87) PCT Pub. No.: WO2018/017089

PCT Pub. Date: Jan. 25, 2018

(65) Prior Publication Data

US 2019/0127601 A1 May 2, 2019

(51) Int. Cl.

| | |
|---|---|
| ***C09D 11/54*** | (2014.01) |
| ***C09D 11/12*** | (2006.01) |
| ***D21H 19/12*** | (2006.01) |
| ***D21H 17/66*** | (2006.01) |
| ***D21H 17/60*** | (2006.01) |
| ***D21H 17/20*** | (2006.01) |
| ***D21H 17/00*** | (2006.01) |
| ***D21H 11/04*** | (2006.01) |
| ***B41M 5/50*** | (2006.01) |
| ***D21H 19/18*** | (2006.01) |
| ***D21H 19/20*** | (2006.01) |
| ***B41M 5/52*** | (2006.01) |
| *B41M 5/00* | (2006.01) |
| *C09D 191/06* | (2006.01) |

(52) U.S. Cl.

CPC ............... *C09D 11/54* (2013.01); *B41M 5/50* (2013.01); *B41M 5/52* (2013.01); *C09D 11/12* (2013.01); *D21H 11/04* (2013.01); *D21H 17/20* (2013.01); *D21H 17/60* (2013.01); *D21H 17/66* (2013.01); *D21H 17/74* (2013.01); *D21H 19/12* (2013.01); *D21H 19/18* (2013.01); *D21H 19/20* (2013.01); *B41M 5/0017* (2013.01); *B41M 5/5218* (2013.01); *B41M 5/5236* (2013.01); *B41M 5/5254* (2013.01); *C09D 191/06* (2013.01)

(58) Field of Classification Search

None

See application file for complete search history.

(56) References Cited

U.S. PATENT DOCUMENTS

| | | | | |
|---|---|---|---|---|
| 7,361,399 B2 | 4/2008 | Song et al. | | |
| 8,075,962 B2 | 12/2011 | Tran et al. | | |
| 8,765,852 B1 * | 7/2014 | Swei | C09D 133/08 | 524/277 |
| 9,421,809 B2 * | 8/2016 | Niu | C09D 5/002 | |
| 2007/0113997 A1 * | 5/2007 | Glittenberg | D21H 19/54 | 162/175 |
| 2008/0233317 A1 | 9/2008 | Matsuura et al. | | |
| 2010/0129553 A1 | 5/2010 | Jackson et al. | | |
| 2012/0308790 A1 * | 12/2012 | Backfolk | D21H 17/66 | 428/206 |
| 2013/0189457 A1 | 7/2013 | Skaggs et al. | | |
| 2014/0212591 A1 * | 7/2014 | Swei | C09D 4/06 | 427/385.5 |
| 2015/0030869 A1 * | 1/2015 | Preston | C09D 17/004 | 428/537.5 |
| 2015/0298480 A1 | 10/2015 | Mizuno et al. | | |
| 2016/0009114 A1 | 1/2016 | Leifert et al. | | |

FOREIGN PATENT DOCUMENTS

| | | |
|---|---|---|
| CN | 101253050 | 8/2008 |
| CN | 102378693 | 3/2012 |
| CN | 103384601 A | 11/2013 |
| CN | 104955656 | 9/2015 |
| CN | 104968741 | 10/2015 |
| CN | 105143553 | 12/2015 |
| EP | 2762534 A1 | 8/2014 |
| JP | 2015096660 A | 5/2015 |
| RU | 2507335 C2 | 2/2014 |
| WO | WO-2010114560 A1 | 10/2010 |
| WO | WO-2012020334 A1 | 2/2012 |
| WO | WO-2014120175 A1 | 8/2014 |
| WO | WO-2014120186 A1 | 8/2014 |

OTHER PUBLICATIONS

Smook, Gary A., Handbook for Pulp and Paper Technologists, 2nd ed, Angus Wilde Publications, 1992, pp. 228, 289. (Year: 1992).*

Definition of “entire”, Meriam-Webster Dictionary, [online], retrieved from the Internet, [retrieved Apr. 20, 2020], <URL:https://www.merriam-webster.com/dictionary/entire>. (Year: 2020).*

J. Peel, Paper Science & Paper Manufacture 1999, p. 90. (Year: 1999).*

International Search Report and Written Opinion dated Mar. 30, 2017, PCT Patent Application No. PCT/US2016/043263, filed Jul. 21. 2016, Federal Institute of Industrial Property, Moscow, Russia, 7 pages.

* cited by examiner

*Primary Examiner* — Dennis R Cordray

(74) *Attorney, Agent, or Firm* — Dierker & Kavanaugh PC

(57) ABSTRACT

An ink fixative solution including a polyvalent metal salt; a wax; a dispersing agent; and water in an amount to provide from about 10% to about 35% solids content in the ink fixative solution is disclosed

11 Claims, No Drawings

INK FIXATIVE SOLUTION

CLAIM FOR PRIORITY

The present application is a national stage filing under 35 U.S.C. § 371 of PCT application number PCT/US2016/043263, having an international filing date of Jul. 21, 2016, the disclosure of which is hereby incorporated by reference in its entirety.

BACKGROUND

Corrugated linerboard or containerboard packaging is often used as a packaging material. This cellulose fiber-based material includes a fluted medium bonded to one or two flat liner paper faces. The fluted medium and the liner paper are usually made of Kraft pulp. In a typical manufacturing process for corrugated paperboard packaging materials, the fluted medium is first formed by heating and moistening a sheet of corrugating medium and then forming the flute pattern in the sheet using geared wheels. The fluted medium is then bonded using an adhesive to one sheet of liner paper for single-faced corrugated linerboard, or between two sheets of liner paper for double-faced corrugated linerboard or containerboard. Kraft containerboard is often unbleached and brown in color. Sometimes one face of containerboard is bleached or coated to make a surface for printing. In other cases, the normal unbleached surface of the containerboard may be printed on. Printing on containerboard is often performed using offset or flexographic printing processes after the containerboard has been corrugated.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As used herein, the term "ink fixative" refers to a composition capable of receiving ink and holding colorants in the ink to a greater degree than a porous substrate not treated with an ink fixative. In particular, the ink fixatives described herein are capable of holding colorants at or near the surface of a substrate so that optical density and color gamut of the printed image may be improved compared to a porous substrate that is not treated with the ink fixative. Likewise, "ink fixative solution" refers to a solution used to deliver the ink fixative to the substrate.

The ink fixative solution may be applied to papers intended for packaging applications. The papers can be a single layer of a multilayer paper. The paper may be brown Kraft, White Top or bleached board. The paper may be manufactured from chemical, wood, or recycled fiber. As an example, the paper may be a liner intended for printing on HP Page Wide web presses and converted into corrugated boxes. In this aspect, the liner paper may be used as a double face liner and may be converted directly in a corrugator or laminated onto a double face liner after corrugation. The paper may also be boards used for boxes and other packaging applications.

By their nature, corrugated packaging processes present difficulties with respect to treating the corrugated packaging materials with ink fixative and printing ink. The equipment presently used for manufacturing Kraft paper often does not include a size press. In other types of paper manufacturing, a size press is often used to apply coatings to the paper. Because of the layout of machinery involved, it may be difficult or impossible to add a size press into existing manufacturing processes that do not already include a size press. Thus, the ink fixative solutions according to the present technology may not be applied using a size press in certain existing paper manufacturing processes that do not already have a size press. However, in some examples of the present technology, the ink fixative solution may be sprayed onto the paper surface at a convenient location in the existing paper manufacturing process.

Locations suitable for spraying the ink fixative solution are after the final drying section and/or near the final rewind. The ink fixative solution according to the present technology may include a polyvalent metal salt, a wax, a dispersing agent, and water in an amount to provide from about 10% to about 35% solids content in the ink fixative solution. The ink fixative solution may provide for high quality printing on paper, such as Kraft paper, with high optical density and color gamut, while also retaining sufficient durability of the printed image.

The polyvalent metal salt may be present in the ink fixative solution to improve inkjet print quality. Generally, the polyvalent metal salt may be any water-soluble polyvalent metal salt. In specific examples, the polyvalent metal salt may include calcium chloride ($CaCl_2$), magnesium chloride ($MgCl_2$), magnesium sulfate ($MgSO_4$), aluminum chloride ($AlCl_3$), calcium nitrate ($Ca(NO_3)_2$), magnesium nitrate ($Mg(NO_3)_2$), magnesium acetate ($Mg(CH_3COO)_2$), zinc acetate ($Zn(CH_3COO)_2$) calcium propionate ($Ca(C_2H_5COO)_2$), or a combination thereof. In a particular example, the polyvalent metal salt may be calcium chloride. In further examples, the polyvalent metal salt may include a metal cation selected from calcium, copper, nickel, magnesium, zinc, barium, iron, aluminum, chromium, or another polyvalent metal. The polyvalent metal salt may also include an anion. In some examples, the anion may be fluoride, chloride, iodide, bromide, nitrate, chlorate, sulfate, acetate, or $RCOO^-$ where R is hydrogen or any low molecular weight hydrocarbon chain, e.g., $C_1$ to $C_{12}$. In a more specific example, the anion may be a carboxylate derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid. The cationic salt may also be a mixture of two or more different cationic salts In some cases, the polyvalent metal salt may be present in an amount from about 1 wt. % to about 99 wt. % with respect to the entire weight of the ink fixative solution. In more specific examples, the polyvalent metal salt may be present in an amount from about 5 wt. % to about 95 wt. %, for example from about 50 wt. % to about 90 wt. %, and as a further example from about 60 wt. % to about 87 wt. % with respect to the entire weight of the ink fixative solution.

In examples where the polyvalent metal salt is a mixture of two or more salts, the total amount of the mixture of salts may be within these ranges. In other words, whatever range is considered, it is understood that the range relates to total concentrations of salts, whether there be one, two, three, etc., specific salt species present.

In some cases, the polyvalent metal salt, such as calcium chloride, may be present in an aqueous solution with a specific gravity of the solution ranging from about 1 to about 1.41, for example from about 1.09 to about 1.298, and as a further example from about 1.11 to about 1.189 when the specific gravity is at 30° C.

The ink fixative solution may be an aqueous solution. In some examples, the ink fixative solution may include water in an amount to provide from about 10 wt. % to about 35 wt. % solids content, such as about 15 wt. % to about 33 wt. %, for example about 30 wt. %, with respect to the entire weight of the ink fixative solution. In an aspect, the ink fixative solution may comprise a high solids polyvalent metal salt concentration, such as 10% or above, which may add 2% or less moisture to the paper. The small amount of moisture should not require additional drying in the paper making operation. After application, the water is removed from the ink fixative solution leaving ink fixative behind on the paper.

The ink fixative solution may also include a wax. The wax may improve the ink durability during corrugation. Generally, any suitable wax may be used in the ink fixative solution. As such, the wax may be polyethylene waxes, petroleum waxes, paraffins, carnauba waxes, polypropylene waxes, crystalline and microcrystalline waxes, amide waxes (oleamide, stearamide, erucamide, cyclic amide, etc.), and combinations thereof. In an aspect, the wax may be a high density polyethylene wax. In another aspect, the wax may be a micronized polypropylene wax, for example Mju:Wax 4810 available from Cerona GmbH.

In an aspect, the wax may be a polyethylene wax or modified paraffin wax. An example of polyethylene wax include high density polyethylene (HDPE) wax, which has a density ranging from about 0.93 g/mL to about 0.97 g/mL. The density of HDPE is generally higher than the density of low density polyethylene (LDPE) due, at least in part, to a smaller amount of molecular branching in HDPE. An example of modified paraffin wax particles include paraffin wax that has been modified to improve solubility in water, e.g., via emulsification. The modified paraffin wax may be surface modified, chemically modified, etc. Some specific examples of wax that may be used include those of the JONCRYL® Wax series (such as JONCRYL® Wax 22, JONCRYL® Wax 26, and JONCRYL® Wax 120 available from BASF Corp.), and those of the AQUACER® series (such as AQUACER® 498, AQUACER® 501, AQUACER® 505, AQUACER® 513, AQUACER® 535, AQUACER® 537, AQUACER® 539, and AQUACER® 552 available from BYK-Gardner, Columbia, Md.). The wax may also or otherwise be chosen from water-dispersed wax available from Micro Powders, Inc., Tarrytown, N.Y.

The wax may have i) a high melting temperature Tm and/or ii) a small average particle size. In an example, the wax may have a high Tm such as one that is equal to or greater than about 100° C. In an example, the Tm of the wax may range from about 100° C. to about 150° C. In another example, the Tm of the wax may range from about 110° C. to about 135° C. Further, the wax may have an average particle size (in terms of effective diameter assuming that the individual wax particles are not perfectly spherical) ranging from about 5 μm to about 15 μm. In another example, the wax particles may have an average particle size of about 5 μm to about 10 μm, such as about 7 μm (D50). The particle size of the wax may be measured by various techniques, such as dynamic light scattering.

The wax may be present in the ink fixative solution in an amount ranging from about 1 to about 15 wt. %, for example from about 2 to about 13 wt. %, such as 8 wt. % relative to the total weight of the ink fixative solution.

In an aspect, the wax may be dispersed in a dispersing agent. The dispersing agent may be a polymeric dispersant or a surface active agent, such as an anionic, cationic, zwitterionic, or nonionic surface active agent. The polymeric dispersant may have anchoring groups and polymeric chains. In an aspect, the polymeric dispersant may be a polymer with terminal functional groups, a polymer with functional groups at either end, a BAB block copolymer, an ABA block copolymer, a random copolymer, or a "COMB" copolymer. In an aspect, the polymeric dispersant may be derived from a free radical polymerization reaction of a reaction mixture including a hydrophilic component selected from the group consisting of acrylic acid monomer and alkylacrylic acid monomer; a hydrophobic component selected from the group consisting of an alkylarylpoly($C_3$-Cio-alkylene)glycol alkylacrylate, a polydimethylsiloxane methacrylate, and a polydimethylsiloxane-co-poly($C_3$-Cio-alkylene)glycol methacrylate; and a protective colloid component selected from the group consisting of a tri-alkylarylpolyethyleneglycol alkylacrylate, and a polydimethylsiloxane-co-polyethylene glycol methacrylate. In another aspect, the dispersing agent can be a block co-polymer based dispersant. The polymeric dispersant may have a weight average molecular weight (Mw) from about 5,000 to about 30,000 as determined by gel permeation chromatography (GPC). The dispersing agent may be present in the ink fixative solution in an amount ranging from about 0 wt. % to about 5 wt. %, for example from about 0.5 wt. % to about 4 wt. %, and as a further example from about 1 wt. % to about 3.5 wt. % by weight based upon the total weight of the ink fixative solution.

The ink fixative solution may include a binder, such as a latex. The latex may bind the wax to the paper. The latex may also help the polyvalent metal salt penetrate into the paper. The latex may include latices that include monomers such as styrene ($C_6H_5CH{=}CH_2$), 1,3-butadiene ($C_4H_6$), acrylonitrile ($C_3H_3N$), or combinations thereof. In an aspect, the latex binder may include latices such as styrene butadiene rubber (SBR), styrene-(butyl) acrylate (S(B)A), polyvinylacetates (PVAc), or combinations thereof. The ink fixative solution may include a styrene/butadiene copolymer, a styrene/butadiene/acrylonitrile copolymer, or combinations thereof.

In an aspect, the latex may be tolerant to high concentrations of a polyvalent metal, such as calcium, to minimize the possibility of precipitation. The tolerance of the latex to calcium ions may be determined by titration of a test solution of the latex with calcium chloride. A latex with branching may exhibit several orders of magnitude higher calcium tolerance as compared to a linear latex. The latex may have calcium tolerance of 5000 ppm $CaCl_2$ or more, for example 20,000 ppm $CaCl_2$ or more, and as a further example 50,000 ppm $CaCl_2$ or more. The latex for use herein may be stable in high calcium ion environments, and may not precipitate at elevated calcium ion levels.

The latex may be present in the ink fixative solution in an amount ranging from about 0 wt. % to about 40 wt. %, for example from about 1 wt. % to about 35 wt. %, and as a further example from about 5 wt. % to about 30 wt. % by weight based upon the total weight of the ink fixative solution.

The present technology also extends to methods of making ink fixative treated paper. The method includes forming a moist paper web and drying the moist paper web to form a substantially dried paper web. As used herein a "substantially dried paper web" can include paper having a moisture content ranging from about 1% to about 10% by weight, such as from about 1.5% to about 8%, and as a further example from about 2% to about 7% by weight of water relative to the total weight of the paper. An ink fixative solution is applied, after a final drying section and/or at or near a final rewind, to the substantially dried paper web to form an ink fixative treated paper. The ink fixative solution includes a polyvalent metal salt, a wax, a dispersing agent, and water in an amount to provide from about 10% to about 35% solids content in the ink fixative solution. In an aspect, the method can include spraying the ink fixative solution onto the substantially dried paper web. In another aspect, the method can include rolling the ink fixative solution onto the substantially dried paper web.

This method may be used during the process of manufacturing paper. In certain aspects, the paper being manufactured may be a kraft paper for corrugated packaging materials as described above. The methods may in some cases be applied to existing manufacturing processes for Kraft paper. In some examples, this may be accomplished by adding equipment for applying the ink fixative solution into the existing processes. In particular, the ink fixative solution may be applied using a liquid application system (LAS). The LAS is a two roll transfer system that may apply a liquid across a paper web. The LAS would use very small amounts of the ink fixative solution and no additional drying would be required.

In some examples the ink fixative solution may be formulated to be sprayable. For the example, the ink fixative solution may have a suitable viscosity and suitable surface tension for spraying. In various examples, a sprayer having the ink fixative solution may be placed after the final drying section and/or at or near the final rewind of the paper making machine. For example, the ink fixative solution may be sprayed onto a substantially dried paper web after the final drying section and before the rewind. In this manner, the ink fixative solution may be sprayed onto one side, e.g. a first side, of the paper web. As the paper web is wound around the rewind, the ink fixative solution on the first side (e.g., a top side) of the paper web may come into contact with the second side (e.g., a bottom side) of the paper web. The ink fixative solution may therefore be able to treat both sides of the paper web although it was sprayed onto one side of the paper web. Additionally, because the ink fixative solution is applied after the final drying section and/or before the rewind, the incidence of exposure of the equipment to the corrosive polyvalent metal salt is reduced or eliminated.

The ink fixative solution may have a high polyvalent metal salt concentration to minimize the amount of water or aqueous solution present in the ink fixative solution. For this reason, the ink fixative solution may be able to dry by adsorption, without the need for drying with a dryer, into the paper with a minimal change to paper moisture.

In some examples, the manufacturing process may be a paper manufacturing process without a size press. For example, the method for making an ink fixative treated paper, such as a Kraft paper, may not subject the treated paper to a sizing treatment. In such processes, locations for adding an ink fixative applicator into the process may be limited. Therefore, a sprayer may be used as the ink fixative applicator in the locations described above. However, in other examples, the manufacturing process may be configured differently from those described above. Therefore, in some cases the ink fixative applicator may be another type of applicator. In various other examples, the ink fixative applicator may coat the web with the ink fixative solution by dip coating, cascade coating, roll coating, gravure coating, curtain coating, air knife coating, cast coating, Meyer rod coating, blade coating, film coating, metered size press coating, puddle size press coating, calender stack, and/or by using other known coating techniques.

As explained above, the ink fixative solution may improve optical density and color gamut of images printed on paper, such as Kraft paper. These effects may be achieved without requiring any additional coatings. For example, the ink fixative solution may be applied to the paper without applying any additional sizing agents, pigments, or other additives commonly used to improve a printing surface of paper materials.

After a paper sheet has been manufactured using the methods of the present technology, the paper sheet may be further used to make packaging materials with images printed thereon. The present technology provides an ink fixative treated paper that may be printed on before corrugation. Because the paper is not corrugated before printing, the printing may be done with printing techniques that may not be used with corrugated board. In one example, printing may be performed by high speed digital press. In a specific example, printing may be performed by a high speed ink jet press, such as the HP high speed Web Press®. In other examples, printing may be performed by offset printing, dry electrophotographic printing, liquid electrophotographic printing, flexographic printing, or gravure printing.

In some cases, the ink used for printing on the paper may be a water-based ink, such as a water-based inkjet ink, or a pigmented water-based inkjet ink. Inkjet inks generally include a colorant dispersed or dissolved in an ink vehicle. As used herein, "liquid vehicle" or "ink vehicle" refers to the liquid fluid in which a colorant is placed to form an ink. A wide variety of ink vehicles may be used with the methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle may carry solid additives such as polymers, latexes, UV curable materials, plasticizers, etc.

Generally the colorant discussed herein may include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. In most instances, dyes are water soluble. Furthermore, as used herein, "pigment" generally includes pigment colorants, magnetic particles, aluminas, silicas, and/or other ceramics, organo-metallics or other opaque particles. In one example, the colorant may be a pigment. In a further example, the colorant may be an anionic pigment that may interact with metal cations from the polyvalent metal salt in the ink fixative layer of the substrate Typical ink vehicle formulations may include water, and may further include co-solvent(s) present in total at from 0.1 wt. % to 40 wt. %, depending on the jetting architecture, though amounts outside of this range may also be used. Further, additional non-ionic, cationic, and/or anionic surfactants may be present, ranging from 0.01 wt. % to 10 wt. %. In addition to the colorant, the balance or much of the remaining of formulation components may be purified water and other known liquid additives. Other solids may likewise be present in the inkjet ink, such as latex particles.

Consistent with the ink formulations of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), ACTICIDE® (Thor Specialties Inc.) and combinations thereof.

Additionally, the present technology extends to ink fixative treated paper. In one example, an ink fixative treated paper may include a paper, such as a Kraft paper, and an ink fixative layer on a surface of the paper. The ink fixative layer may include a polyvalent metal salt, a wax, a dispersing agent, and water in an amount to provide from about 10% to about 35% solids content in the ink fixative solution.

In addition to providing improved optical density and color gamut when the paper is printed, the ink fixative layer may also be sufficiently durable to undergo the corrugation process after printing. The corrugation process may involve high pressures, temperatures, and frictional forces on the Kraft paper. However, images printed on the ink fixative layer according to the present technology may go through the corrugation process with little or no visible damage to the printed image When referring to "high speed" as it is related to a digital printing press or other high speed printer, e.g., presses such as the HP T230 Web Press® or the HP T350 Web Press®, or presses such as page wide office printers (PWA) including the HP OfficeJet® Pro X duplex printer. In one example, the HP T350 Web Press® may print on media at a rate of 400 feet per minute. This capability would be considered high speed. In another example, and more generally, printing at 100 feet per minute would also be considered high speed.

EXAMPLES

Example 1

Print Density

This example simulated spraying of the ink fixative solution after a final drying section and/or at or near a rewind of a paper machine. Multiple ink fixative solutions were prepared each having a different amount of polyvalent metal salt to achieve various salt solutions, e.g., a 2% salt solution, a 5% salt solution, etc. A piece of paper was cut to 2 inches by 12 inches and taped to a hard plastic surface. An airbrush (Master Airbrush model E91 with matching air compressor) having air pressure of 60 psi was held approximately 10 inches above the sample and move the length of the sample in approximately 1.5 seconds. The paper was allowed to adsorb the ink fixative solution overnight. The weight of the paper was measured before application of the ink fixative solution and immediately after spraying to determine the amount of the ink fixative solution applied to the sample.

The sample was tested for print density using the ColorPRO® ink drawdown procedure. An uncoated printing paper (white) spec has a KOD (optical density of black ink) and MOD (optical density of magenta ink) greater than 1.20. This is an established guideline for good web press color gamut and line quality. The more polyvalent metal ion on the surface of the sample, the darker the ink density, which translates to better imaging on a web press. The ink fixative solution achieved an optical density above 1.20 using a 10% salt solution, which added about 2% water by weight to the sample. Table 1 shows the optical density for black and magenta at varying polyvalent metal salt concentrations.

TABLE 1

| Optical Density | | | | | | |
|---|---|---|---|---|---|---|
| % salt soln. | 0% | 2% | 5% | 10% | 20% | 30% |
| Average Density - Black, Optical Density Units | 0.94 | 1.17 | 1.30 | 1.45 | 1.51 | 1.52 |
| Average Density - Magenta, Optical Density Units | 0.83 | 1.01 | 1.08 | 1.27 | 1.36 | 1.36 |
| Average of est. salt added by wt., % | 0.00 | 0.04 | 0.07 | 0.20 | 0.28 | 0.53 |
| Average of est. water added by wt., % | 2.10 | 1.84 | 1.38 | 1.84 | 1.13 | 1.24 |

Example 2

Line Bleed

An ink fixative solution was applied to two papers using a spray nozzle (model Unijet 02). The spray pressure was 100 psi. The nozzle was mounted near the final rewind and after the final drying section and was positioned to spray a top side of a paper web. One nozzle covered 24 inches wide of paper web with a web speed of 400 meters/minute. The two papers were (1) a White Top packaging liner 205 gsm (top, print side is white, back is brown), and (2) Brown Kraft packaging liner 205 gsm.

The ink fixative solution included 87 wt. % calcium chloride, 7 wt. % micronized polypropylene wax, 5 wt. % dispersing agent, and water to give 15% solids content.

Reduced line bleed is an indication of better print quality. The line bleed was measured by printing a black line on a yellow background using OfficeJet Pro 7612 and measured using ISO standard 13660 section 5.3.2. The meter used to measure the line is Quality Engineering Associated PIAS II. A zero would indicate that the edge is perfectly straight and there is no line bleed. The higher the number means the more ragged the edge and the greater the line bleed. The results are shown in Table 2.

TABLE 2

| Line Bleed | | |
|---|---|---|
| | Top Side | Back Side |
| Base Sheet, White Top | 29 μm | 26 μm |
| Treated White Top-top side treated | 15 μm | 19 μm |
| Base Sheet, Brown Kraft | 32 μm | 24 μm |
| Treated Brown Kraft-top side treated | 18 μm | 22 μm |

The base sheet (white top and brown Kraft) were not treated with an ink fixative solution. The results show an improvement, i.e., a reduced line bleed, on the top side of both treated papers as compared to the untreated base sheet (top sides). The application of the ink fixative solution after the final drying section and/or before the rewind resulted in the back side, i.e., a second side, of the paper receiving treatment, even though the top side, i.e., a first side, was the treated side. The ink fixative solution was quickly in contact with the back side in a wound roll, resulting in formula transfer from top to back. The results also show an improvement, i.e., a reduced line bleed, on the back sides of both treated papers as compared to the untreated based sheet (back sides).

Example 3

Optical Density

The drawdown optical density of a black ink was determined using the papers and ink fixative solution from Example 2. The more polyvalent metal ions on the surface of the sample, the darker the black ink density, which translates to a better image on the web press. The results are shown in Table 3.

TABLE 3

| Drawdown Optical Density | |
|---|---|
| | Top Side |
| Base Sheet, White Top | 0.98 |
| Treated White Top-top side treated | 1.34 |
| Base Sheet, Brown Kraft | 1.18 |
| Treated Brown Kraft-top side treated | 1.40 |

The results show that the treated sheets are darker, resulting in better imaging, as compared to the base sheet, which was untreated. It is noted that the brown color of the Kraft sheet results in a darker optical density, before and after treatment, compared to the White Top.

Example 4

Color Gamut

The color gamut was determined using the papers from Example 2. The samples were printed with an ink jet printer test bed using web press inks to predict web press image quality. Color gamut is a measure of the volume of the color space achievable with cyan, magenta, yellow and black inks and the white point of the paper. Kraft paper, having a brown color "white point" will have a lower gamut volume than white paper at the same treatment level. The results are shown in Table 4. The treated papers have a greatly increased color gamut compared to the base sheet as a result of the ink fixative solution. Color gamut volume is measured using the CIE L*a*b* color space.

TABLE 4

| Color Gamut | |
|---|---|
| | Top Side |
| Base Sheet, White Top | 84,919 |
| Treated White Top-top side treated | 152,042 |
| Base Sheet, Brown Kraft | 8,326 |
| Treated Brown Kraft-top side treated | 17,423 |

Example 5

Friction

A standard friction test was used to determine the effect of the wax in the ink fixative solution (from Example 2). A treated surface of paper, under pressure, was pulled across the untreated, back side surface of another piece of treated paper. The lower numbers indicate less friction. The results are shown in Table 5 below. As may be seen, the wax in the ink fixative solution was responsible for decreasing the friction. The reduced friction of the printed paper is expected to improve printing durability during the corrugation process.

TABLE 5

| Friction | |
|---|---|
| | Coefficient of Static Friction |
| Base Sheet, White Top | 0.52 |
| Treated White Top-top side treated | 0.29 |
| Base Sheet, Brown Kraft | 0.35 |
| Treated Brown Kraft-top side treated | 0.30 |

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method, comprising:

forming a moist paper web;

drying the moist paper web to form a substantially dried paper web;

applying, after a final drying section, an ink fixative solution to a first side of the substantially dried paper web to form an ink fixative treated paper, wherein the ink fixative solution comprises:

a polyvalent metal salt in an amount ranging from 50 wt.% to 90 wt.%, relative to the entire solids weight of the ink fixative solution, a wax, a dispersing agent, and water in an amount to provide from 10% to 35% solids content in the ink fixative solution; and winding the ink fixative treated paper on a rewind so that the ink fixative solution comes into contact with a second side of the substantially dried paper web, thereby treating the second side with the ink fixative solution.

2. The method of claim 1, wherein applying the ink fixative solution comprises spraying the ink fixative solution onto the first side of the substantially dried paper web.

3. The method of claim 1, wherein ink fixative solution is applied to the substantially dried paper web at or near the rewind.

4. The method of claim 1, wherein the polyvalent metal salt comprises calcium chloride, magnesium chloride, magnesium sulfate, aluminum chloride, calcium nitrate, magnesium nitrate, magnesium acetate, zinc acetate, calcium propionate, and combinations thereof.

5. The method of claim 1, wherein the wax comprises polyethylene waxes, crystalline waxes, microcrystalline waxes, paraffins, carnauba waxes, polypropylene waxes, petroleum waxes, amide waxes, and combinations thereof.

6. The method of claim 1, wherein the ink fixative solution further comprises a latex.

7. The method of claim 1, wherein applying the ink fixative solution comprises rolling the ink fixative solution onto the first side of the substantially dried paper web.

8. The method of claim 1, wherein method does not include a sizing treatment.

9. The method of claim 1, wherein the ink fixative treated paper is a Kraft paper.

10. The method of claim 1, further comprising printing a pigmented ink on the ink fixative treated paper.

11. The method of claim 1, wherein the application of the ink fixative solution after the final drying section and before the rewind reduces or eliminates exposure of paper making equipment used in the method to the polyvalent metal salt.

* * * * *